March 13, 1928.  R. L. DENNISON  1,662,740
INTERNAL COMBUSTION ENGINE
Filed Dec. 22, 1924  6 Sheets-Sheet 1
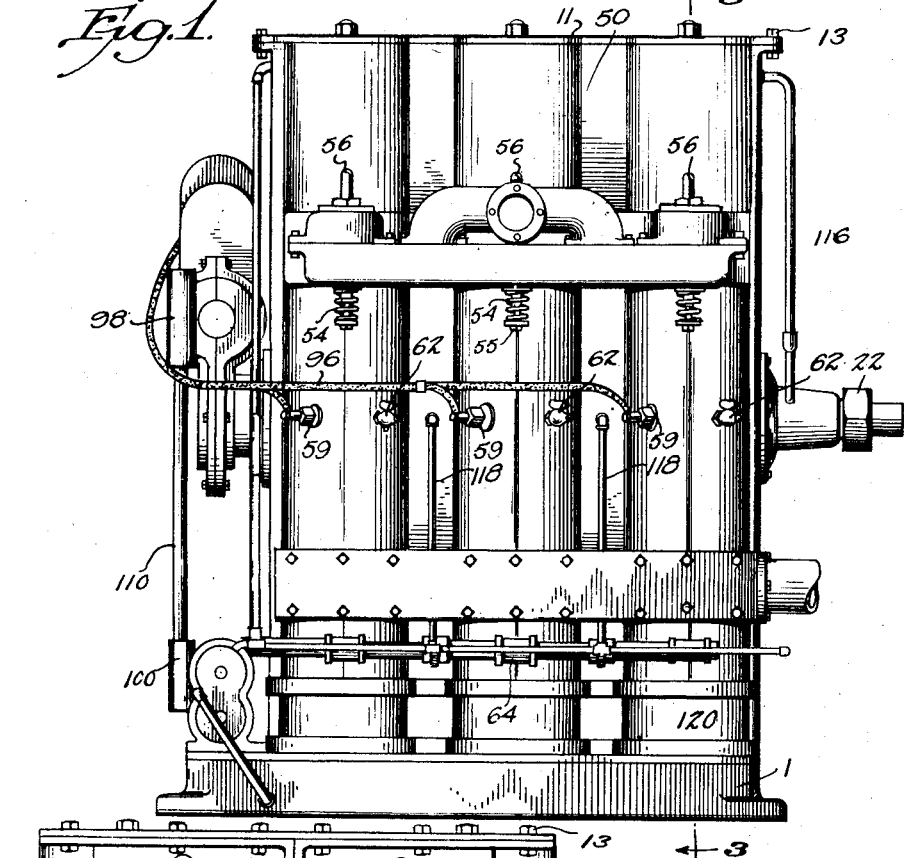
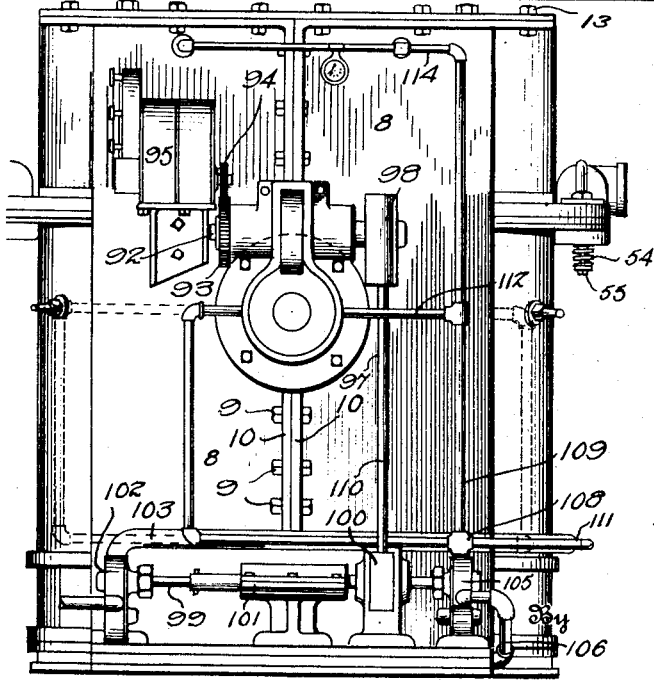
Inventor
ROBERT L. DENNISON
Attorney March 13, 1928.

R. L. DENNISON 1,662,740

INTERNAL COMBUSTION ENGINE

Filed Dec. 22, 1924　　6 Sheets-Sheet 2

Inventor
ROBERT L. DENNISON

By

Attorney

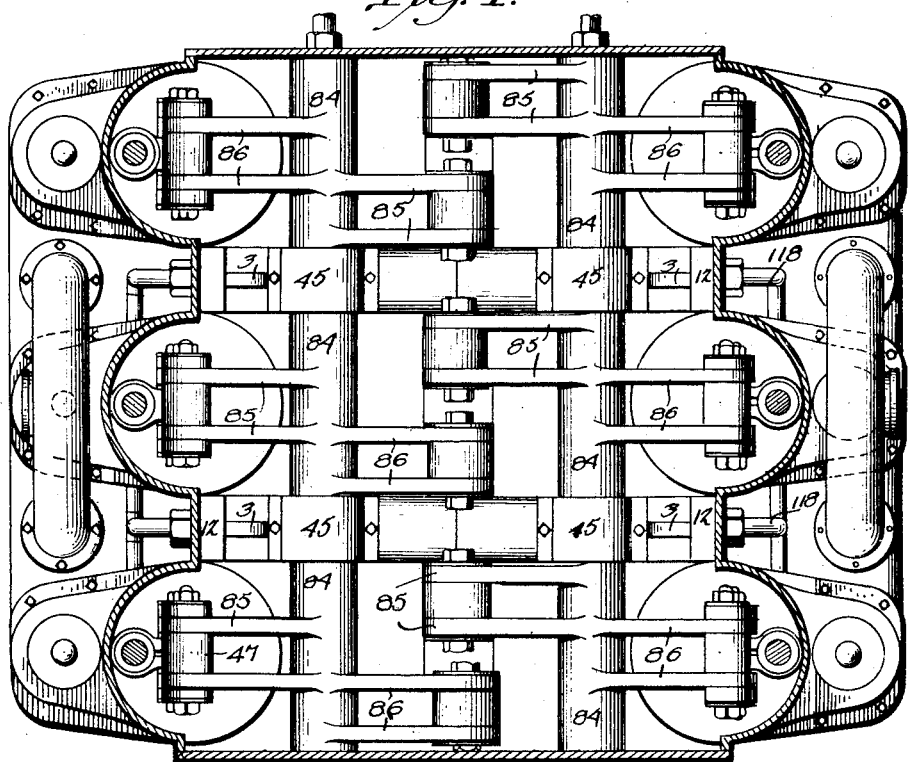
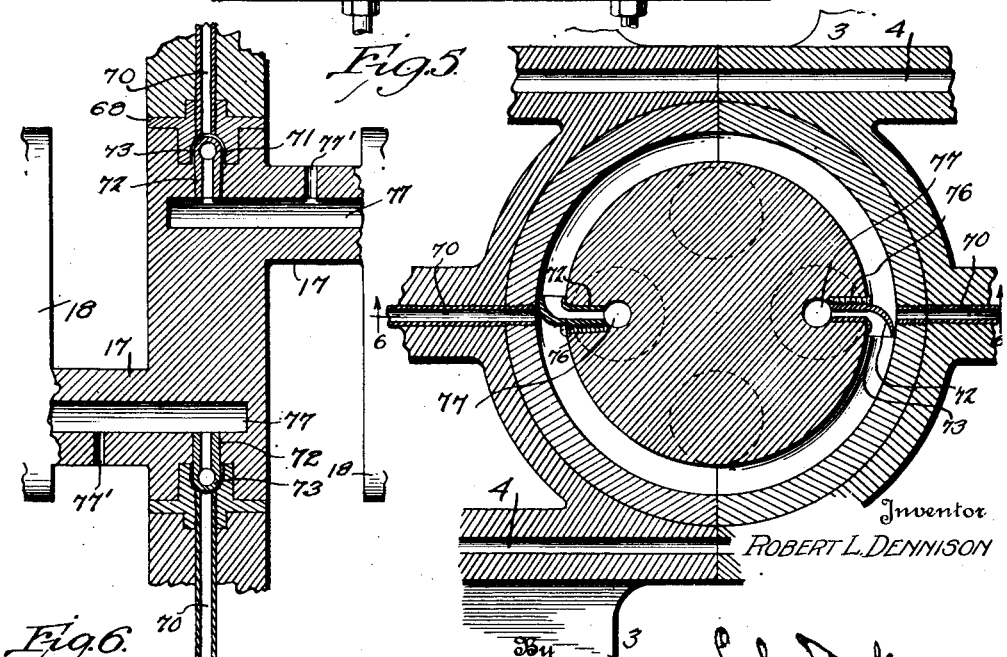

March 13, 1928.

R. L. DENNISON 1,662,740

INTERNAL COMBUSTION ENGINE

Filed Dec. 22, 1924 6 Sheets-Sheet 4

Inventor
ROBERT L. DENNISON

By *[signature]*
Attorney

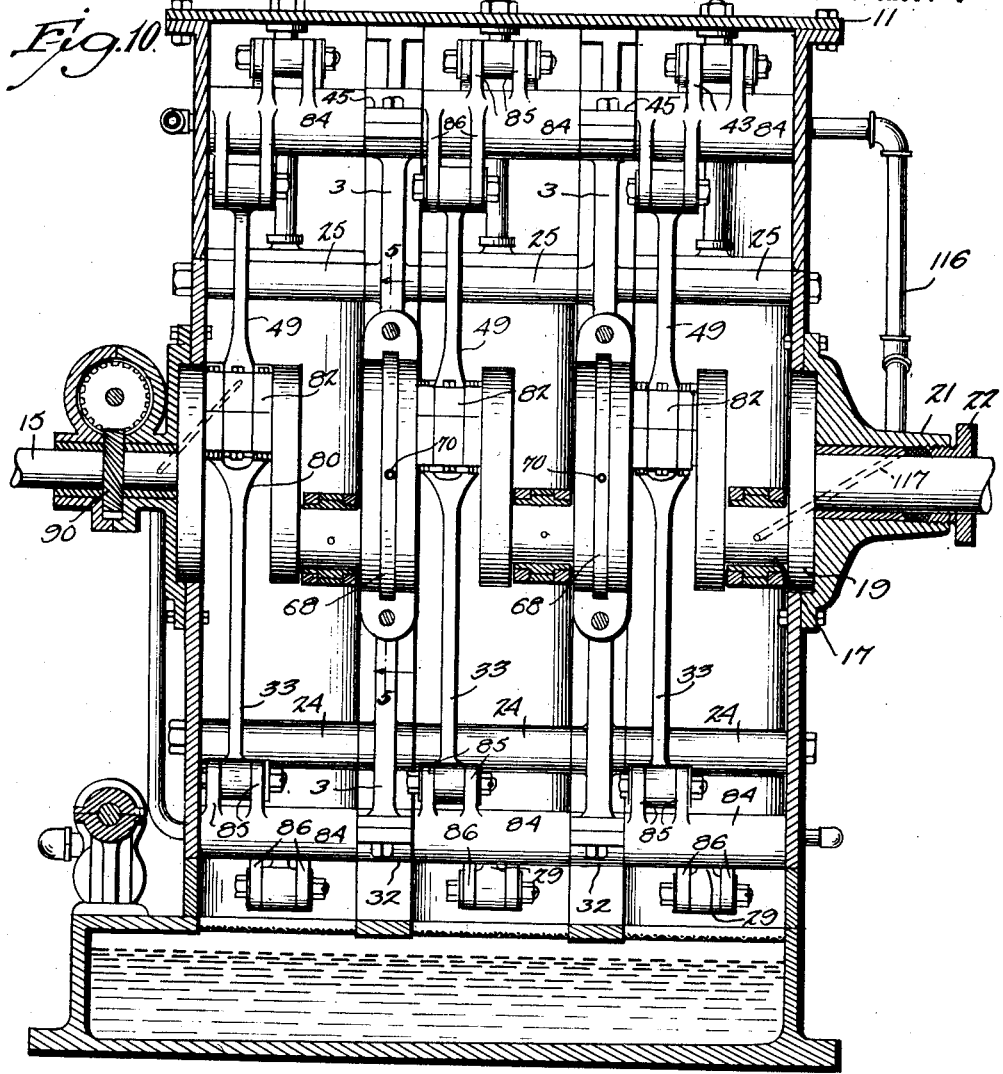

March 13, 1928.  R. L. DENNISON  1,662,740
INTERNAL COMBUSTION ENGINE
Filed Dec. 22, 1924   6 Sheets-Sheet 6
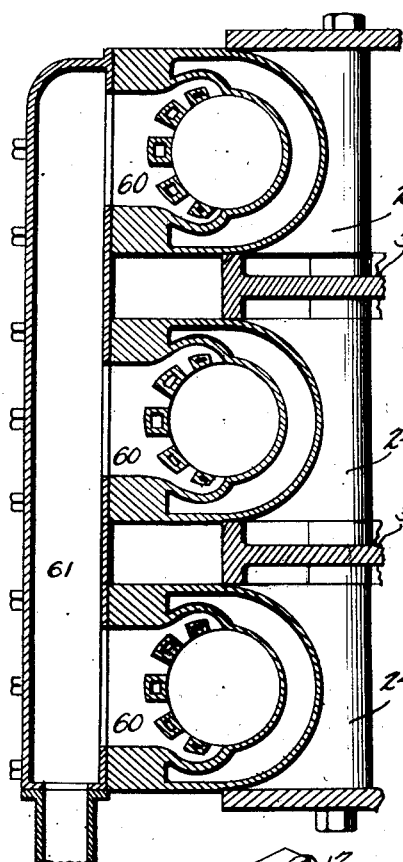
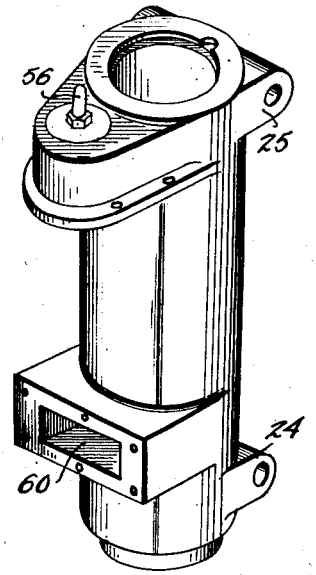
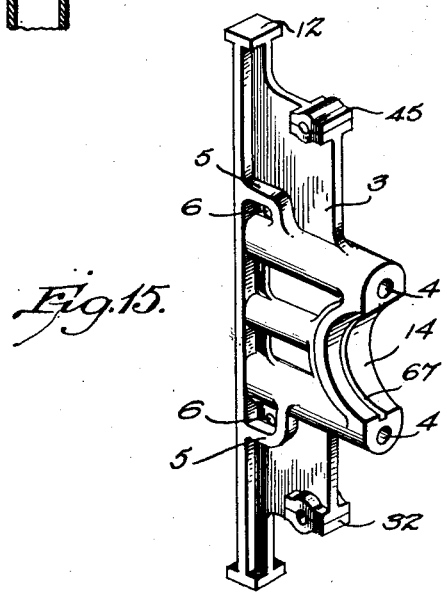
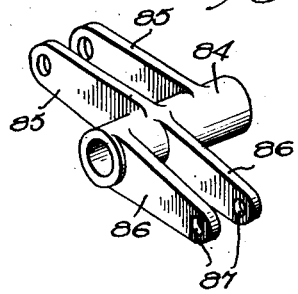
Inventor
ROBERT L. DENNISON Patented Mar. 13, 1928.

1,662,740

UNITED STATES PATENT OFFICE.

ROBERT L. DENNISON, OF NEW YORK, N. Y.

INTERNAL-COMBUSTION ENGINE.

Application filed December 22, 1924. Serial No. 757,547.

This invention relates to internal combustion engines, and more particularly to two-cycle engines.

An object of the invention is to provide a balanced internal combustion engine, in which each moving part is associated with a corresponding moving part traveling in the opposite direction and by means of which vibration is eliminated.

A further object of the invention is the provision of an engine construction in which the loss of power due to the angularity of the connecting rod is eliminated and in which the piston rod travels in a substantially straight line parallel to the axis of the cylinder.

A further object of the invention is the provision of a two-cycle engine in which admixture of the exhaust gases and incoming charge is prevented.

A further object of the invention is the provision of a two-cycle internal combustion engine in which more efficient compression of the incoming charge is obtained.

This application is in part, a continuation of my copending application relating to improvements in engines, filed October 27, 1921, Serial No. 510,845, and is in part, a continuation of my copending application relating to improvements in engines, filed March 24, 1922, Serial No. 546,397.

In the accompanying drawings, I have shown one embodiment of the invention. In this showing:

Figure 1 is a side elevation,

Figure 2 is a front elevation,

Figure 4 is a horizontal sectional view on line 4—4 of Figure 3,

Figure 3:
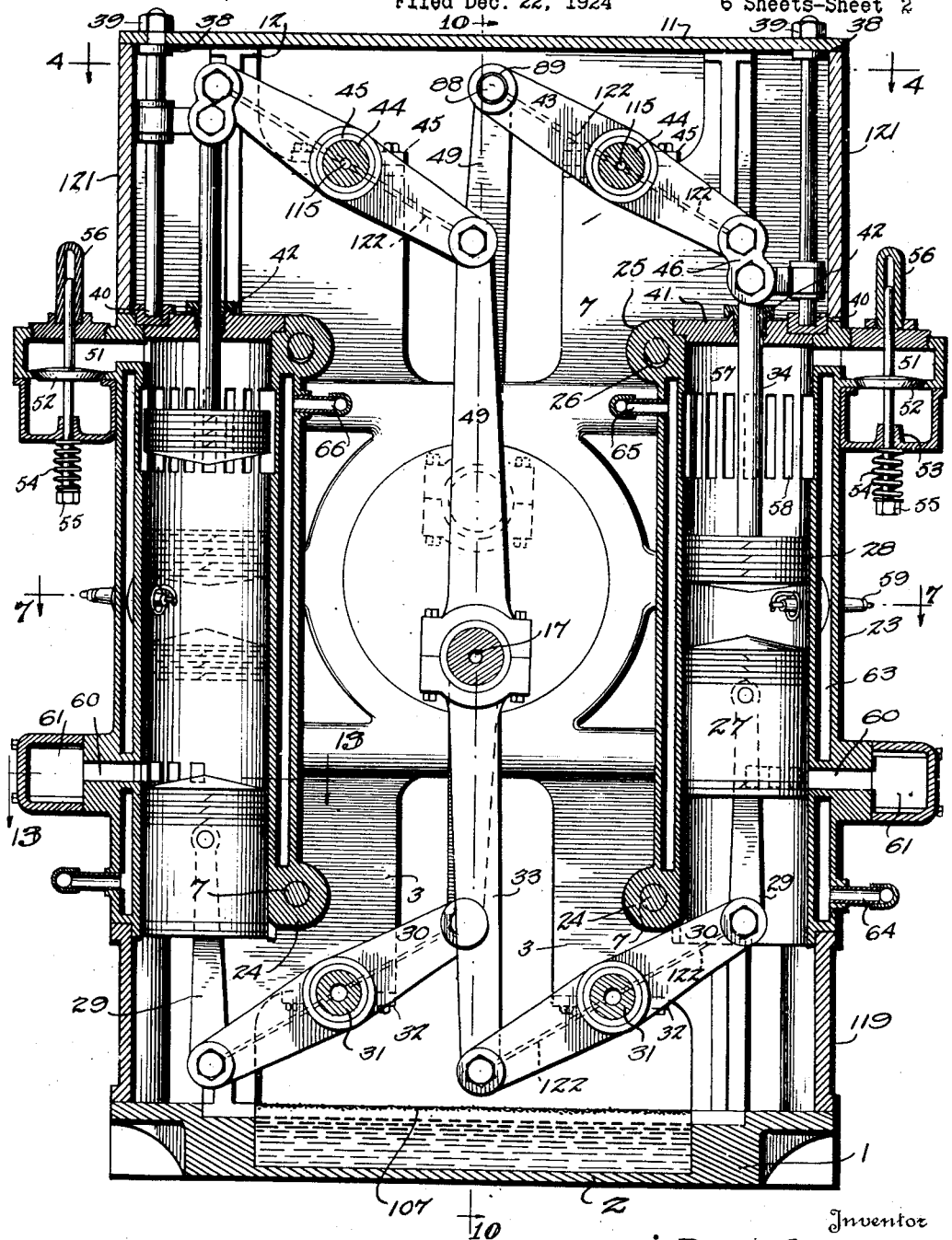
Figure 3 is a vertical sectional view on line 3—3 of Figure 1.
Figure 7:
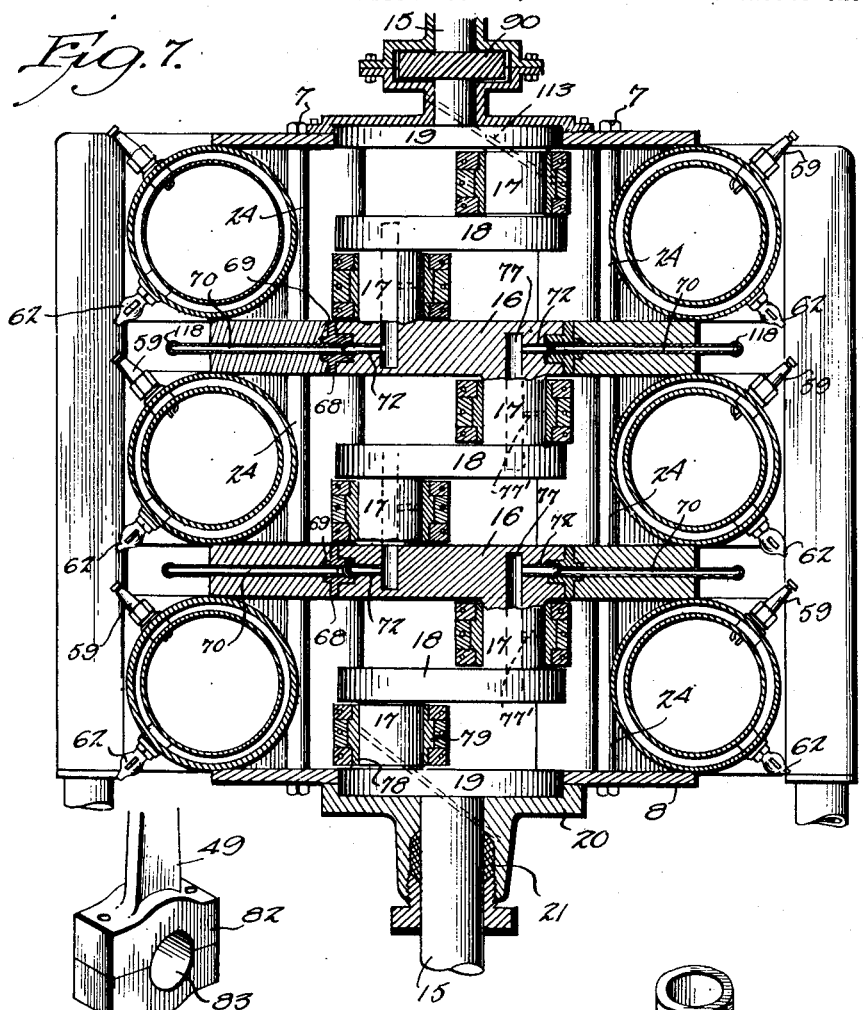
Figure 8:
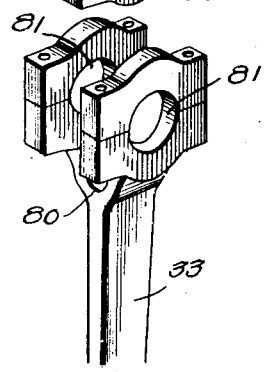
Figure 9:
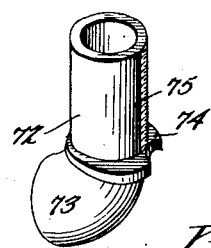

Figure 5 is a detail sectional view through one of the main bearings of the crank shaft taken substantially on line 5—5 of Figure 10, Figure 6 is a detail sectional view on line 6—6 of Figure 5, Figure 7 is a horizontal sectional view on line 7—7 of Figure 3, Figure 8 is a detail perspective view of the adjacent ends of a pair of connecting rods showing the manner in which they are secured to the crank pin, Figure 9 is a detail perspective view of an oil cup shown in Figures 5 and 6 of the drawings, Figure 10 is a vertical sectional view on line 10—10 of Figure 3, Figure 11 is an enlarged side elevation of the upper end of the piston rod and guide therefor, showing a cross head and showing the connection of the piston rod to a rocker arm, Figure 12 is a similar view at right angles to Figure 11, Figure 13 is a horizontal sectional view on line 13—13 of Figure 3, Figure 14 is a perspective view of one of the engine cylinders, Figure 15 is a similar view of one of the frame members, and, Figure 16 is a perspective view of one of the rocker arms.

Referring to the drawings, the reference numeral 1 designates a base which is of the proper size to receive an engine of a desired number of cylinders, the number of cylinders employed being, of course, optional. This base is provided with a central reservoir 2 for oil. The frame of the engine is mounted on the base and includes suitable inner members 3 (see Figure 15) which are arranged in pairs on opposite sides of the base and which are employed between each pair of cylinders longitudinally of the engine construction. Each pair of inner supporting members are provided with openings 4, adapted to be arranged in alinement with each other for the reception of suitable bolts by means of which they are secured to each other. The inner supporting members are also provided with enlargements 5, having openings 6 formed therein at right angles to the openings 4, and adapted to receive bolts 7 which extend longitudinally of the engine to secure the parts of the frame to each other. At each end, of the frame, there is provided end supporting plates 8 which may be made in two sections, as shown in Figure 2 of the drawings, and secured to each other by means of bolts 9, passing through flanges 10 formed in the sections of the end plate. As shown, (see Figure 7), the bolts 7 extend through these end plates to secure them to the rest of the frame. The frame is provided with a top member 11, which rests upon enlargements 12 formed on the upper ends of the inner supporting member (see Figure 15) and is secured to the inner supporting members by means of suitable fastening elements. The top is secured to the end plates 8 by means of bolts, as indicated at 13.

The inner supporting members are each provided with semi-circular recesses 14, which form circular openings when the supporting members of each pair are bolted to each other and form the main bearings of the engine (see Figures 3 and 7). The engine is provided with a crank shaft 15 extending longitudinally thereof and in a six cylinder engine, as shown, arranged in three pairs, there are provided two main bearings adapted to receive disks 16. These disks are connected to each other by diametrically opposed crank pins 17 and a connecting disk 18. On the outer side of the main bearings, the disks are provided with crank pins which are in turn connected to connecting disks 18. The crank shaft is built up according to the number of cylinders forming the engine and each of the connecting disks 18 is provided with a pair of diametrically opposed crank pins extending in opposite directions. The crank pin at each end is connected to an outer disk 19 eccentrically thereof and the projecting portions of the shaft 15 are concentrically connected to these outer disks. Each of the end plates is provided with an opening substantially equal in size to the outer disks 19 and bearing members 20 are secured to the end plates to receive the disks and form parts of the engine bearing. At one end, the shaft is provided with suitable packing 21 retained in position by a packing nut 22, surrounding the shaft.

The engine cylinders are arranged in pairs with one cylinder of each pair on each side of the crank shaft and are connected to the frame by means of the longitudinally extending bolts 7. As shown, the engine is provided with a plurality of cylinders 23, having lugs 24 formed adjacent the bottom and similar lugs 25 formed adjacent the top. The lugs are provided with openings in alinement with the openings 6 in the supporting members and are adapted to receive the bolts 7. The openings in the upper lugs are of slightly greater diameter than the diameter of the bolts, as indicated at 26, (see Figure 3), which will permit a slight modification of the upper portion of the cylinder, if the cylinders expand due to heat, when in operation. Each cylinder is provided with a trunk piston 27 arranged in the lower portion and a standard piston 28 arranged in the upper portion. The trunk piston is provided with a short connecting rod 29 connected to a rocker arm 30, which is pivotally mounted on a shaft 31. In the engine construction, a pair of these shafts is provided adjacent the bottom and these shafts are mounted in suitable bearings 32 carried by the supporting members 3 and 8. The opposite ends of the rocker arms are connected to connecting rods 33 which are connected to the crank pins 17.

The upper standard piston 28 is provided with a piston rod 34, having a cross head 35 (see Figures 11 and 12) connected to its upper end. This cross head carries a sleeve 36 having an opening therein adapted to receive a guide rod 37. The guide rod is provided with a collar 38 adjacent its upper end which is adapted to contact with the lower side of the top 11 and the top is provided with an opening through which the end of the guide rod extends. The extended portion of the guide rod is threaded, and is adapted to receive a nut 39 to retain it in position. The lower end of the guide rod is seated in a bronze member 40 carried by the cylinder head 41. The piston rod 34 passes through the cylinder head and is surrounded by suitable packing 42. By means of the cross head 35 and the guide rod 37, the piston rod is caused to move in a direction longitudinally of the cylinder. The engine is provided with upper rocker arms 43, similar in construction to the lower rocker arms 30 and pivotally supported on a shaft 44, mounted in bearings 45, carried by the supporting member. One end of the rocker arm is connected to the piston rod by a link 46 and a roller 47 is carried by the link and is adapted to contact with a curved surface 48, formed on the top of the cross head 35. The other ends of the rocker arms 43 are connected to upper connecting rods 49.

The engine is provided with an intake manifold 50 adapted to be connected to a suitable carburetor (not shown) and communicating with intake ports 51 adjacent the top of the cylinder and a valve 52 is arranged in each of the intake ports.

As shown, (see Figure 3) the valve is provided with a stem extending above and below it, and the lower portion of the stem passes through a guide formed by a boss 53. The projecting portion of the valve stem is surrounded by a spring 54, the tension of which may be adjusted by means of a nut 55. The upper end of the valve stem is received in a tubular guide 56, which is closed at its outer end. The engine cylinder consists of an upper and lower portion, the upper portion 57 serving as a primary cylinder. The standard piston 28 reciprocates in this upper portion of the cylinder and adjacent the inlet opening, the cylinder is provided with a plurality of longitudinally extending passages or grooves 58. Suitable sparking devices 59 are arranged in the cylinder walls at a point adjacent the center and the cylinder wall is further provided with an exhaust opening 60 adjacent the bottom and communicating with an exhaust manifold 61. A pet cock 62 (see Figure 1) is arranged in each cylinder in the same horizontal plane with the spark plugs. The cylinders are provided with the usual jacket 63 for the circulation of water or other cooling medium and the water jacket is provided with an inlet 64, adjacent the bottom of the cylinder and an outlet 65 adjacent the top. The outlets on each side of the connecting rods are connected to pipes 66 through which the cooling fluid passes.

The main bearings formed by the semi-circular recesses in the inner face of the supporting members 3 are provided with circumferential grooves 67. A bronze ring 68 is arranged between the disk 16 and the bearing. This ring is provided with a central portion 69 of greater thickness than the side portions and the thickened portion of the ring is received in the circumferential groove 67 and in a groove formed in the periphery of the crank shaft disk 16. The bronze ring is formed in two sections (see Figure 5). Each section of the ring is provided with an internally threaded opening, which openings are arranged diametrically opposite each other when the bearing is assembled. These openings are adapted to receive the inner ends of oil pipes 70 which extend through the supporting members 3 (see Figure 7) and which are threaded on their inner ends. When the ends of the pipe are arranged in the threaded openings in the sections of the bearing ring, they support the ring. The bronze ring is provided with a substantially semi-circular groove 71 on its inner face and the disk 16 is provided with oppositely arranged openings for the reception of tubular members 72 which are provided with scoops 73 on their outer ends. At the outer end of the tubular portion 72, there is provided a collar 74 (see Figure 9) which limits the movement of the tubular member into the opening in the disk. After the tubular members have been arranged in the opening, a second threaded opening is formed intersecting the opening which receives the tubular member and a portion of the threads are cut on the side of the tubular member, as indicated at 75. A locking screw 76 is then inserted in the threaded opening which retains the tubular member in the proper position by the engagement of the threads of the screw with the threads 75 on the surface of the tubular member. The inner ends of the tubular members communicate with passages 77 extending transversely of the crank shaft disk and these passages extend through the adjacent crank pins 17, as indicated in dotted lines in Figure 7 of the drawings. The passages 77 communicate with radial passages 77' in the crank pins to lubricate the connecting rod bearings.

The connecting rod bearings consist of a bronze ring 78 which surrounds the crank pin and which is provided with a central portion 79 of greater thickness than the side portions. The lower connecting rod 33 of one cylinder and the upper connecting rod 49 of the other cylinder of each pair are connected to the same crank pin. As shown, one of the connecting rods is forked as at 80, adjacent its end and the forked member is adapted to receive the end of the other connecting rod. The forked connecting rod is provided with openings 81 of the same diameter as the external diameter of the thinner portions of the ring 78 and these openings are adapted to surround the thinner portions of the ring. The ring is made fast to this connecting rod to revolve therewith and the other connecting rod is provided with a bearing portion 82 having an opening 83 for the reception of the thicker portion of the ring. By causing the bearing ring to revolve with one of the connecting rods, the contact due to the movement of this connecting rod takes place between the crank pin and the inner surface of the ring and the contact due to the movement of the other connecting rod takes place between the connecting rod and the outer surface of the ring.

The detail construction of one of the rocker arms 30 or 43 is shown in Figure 16 of the drawings. The construction of the upper and lower rocker arms is the same, and in Figure 16 of the drawings, I have applied the reference numerals of the upper rocker arm thereto. As shown, the rocker arm is provided with a sleeve 84 which receives the shaft 44 and these sleeves extend from each supporting member to the next, as shown in Figure 4 of the drawings, giving a substantial bearing for the rocker arm and thus preventing the rocker arm from getting out of alinement. Extending toward the cylinder, the rocker arm is provided with a pair of spaced parallel arms 85, between which the roller 47 is arranged. On the opposite side of the sleeve, there is provided a pair of arms 86 and the pairs of arms are offset or staggered so that the arm 85 to the left in Figure 16 of the drawings, is in alinement with arm 86 to the right. The arms 86 are provided with openings 87, adjacent their outer ends, and the upper end of the connecting rod 49 is adapted to be arranged between these arms. A pin 88 passes through the openings 87 and through an opening in the connecting rod. The connecting rod carries a bronze bushing 89 surrounding this pin.

The main shaft is provided with a gear 90 arranged in a casing 91 and this gear meshes with a gear (not shown) carried by a shaft 92. One end of the shaft 92 is provided with a gear 93 meshing with a pinion 94 on the shaft of a magneto 95, and suitable lead wires 96 extend from the magneto to the plugs. The opposite end of the shaft 92 is adapted to drive a vertical shaft 97 by means of suitable gearing (not shown) mounted in a casing 98. The shaft 97 is adapted to drive a shaft 99 by means of suitable gearing (not shown) arranged in a casing 100. The shaft 99 is supported in a suitable bearing 101. A water pump 102 is arranged on one end of this shaft and is connected to a water pipe 103 which delivers water or other cooling medium to the inlets 64 of the cylinder jackets. An oil pump 105 is arranged on the opposite end of the shaft and is connected to the oil reservoir 2 by means of a pipe 106. Above the oil reservoir, there is provided a screen 107 for the removal of dirt or other foreign matter from the oil. The outlet side of the pump communicates with a coupling 108 to which a vertical pipe 109 is connected and to which a pair of horizontal pipes 110 and 111 run in opposite directions are connected. The pipe 109 extends upwardly and is provided with a branch 112 extending inwardly of the bearing at one end of the crank shaft. This also lubricates the gear 90 in the gear casing 91 and the passage 113 extends through the shaft and the disk 19 to the end crank pin to lubricate the end connecting rod bearing. In the branch 112, the pipe 109 extends upwardly and communicates with a horizontal pipe 114 by means of which oil is delivered to the interior of shafts 44. As shown (see Figure 3) these shafts are provided with longitudinally extending passages 115. The opposite ends of the passages are connected to a pipe 116 (see Figure 10) which extends downwardly to the packing 21 to lubricate the opposite end of the crank shaft. A passage 117 extends through the crank shaft, the disk 19 and the end crank pin 17 to lubricate the end connecting rod bearing. The pipes 110 and 111 extend along the opposite sides of the engine and communicate with vertical pipes 118, which are connected to the outer ends of the oil pipes 70 by means of which the main bearings are lubricated.

When the engine is assembled with the cylinders on the frame, suitable closure plates 119 are arranged between the bottom of the engine cylinders and the base and bolted in position. As shown, these plates are provided with curved portions 120, which correspond to the curvature of the walls of the cylinder. As shown in Figure 7 of the drawings, the cylinders contact with the supporting members 3 and these supporting members and the walls of the engine cylinders serve as side closures throughout the length of the cylinders. Above the cylinders, there are provided plates 121 which are connected to the top by suitable fastening elements.

In operation, the engine works on the two-cycle principle. With the pistons in the position shown in the cylinder at the left in Figure 3 of the drawings, the downward movement of the top piston creates a partial vacuum in the primary cylinder 57, lifting the valve 52 from its seat by suction against the tension of the spring 54. When starting the engine, it is necessary to open the pet cocks 62 due to the high compression employed and this may be accomplished in any suitable manner. The incoming charge remains in the primary cylinder while the previous charge is being fired and the pistons are again moved outwardly by the explosion. On the outward movement of the pistons, the charge in the primary cylinder is compressed and the valve 52 is forced to its seat. During the outward movement of the pistons, the trunk piston 27 uncovers the exhaust openings 60 and the burned gases are discharged from the cylinder. Immediately after the exhaust openings are brought into communication with the cylinder, the upper piston begins to travel over the portion of the cylinder walls provided with the slots 58 and the compressed, fresh charge in the upper or primary cylinder flows into the firing cylinder. Particular attention is called to the fact that the exhaust gases, having started to flow from the cylinder, will not mix with the fresh charge and that the fresh charge, when compressed, as shown in the cylinder at the right in Figure 3 of the drawings, will be composed entirely of an explosive mixture. The faces of the pistons are V-shaped, as shown, which further assists in removing the exhaust gases, preventing them from forming in a pocket adjacent the center of the piston. The gases are compressed in the primary cylinder at a point removed from the firing chamber and are therefore ordinarily relatively cool during compression.

The explosion in each cylinder forces the two pistons outwardly to swing the rocker arms 30 and 43 on their pivots. As shown (see Figure 7), each cylinder is connected to a pair of crank pins 17. The pair of cylinders at the bottom in Figure 7 of the drawings, are connected to the first two crank pins. The upper piston in the cylinder to the right is connected to the second crank pin and the lower piston is connected to the first crank pin. The cylinder to the left is connected in the reverse manner with the upper piston connected to the first crank pin and the lower piston connected to the second crank pin. As the engine is a two-cycle engine having an explosion for each revolution, each cylinder will apply power to each crank pin during one half of the revolution and the pair of cylinders forming a unit will thus apply power continuously to the crank shaft.

So far as I am aware, I am the first to provide an internal combustion engine in which a pair of cylinders continuously apply power to the crank shaft throughout its revolution. Attention is called to the fact that the angularity of the connecting rod is substantially eliminated, reducing friction on the side walls of the engine cylinders. The upper piston is provided with a piston rod 34, which moves in a straight line due to the cross head 35 and the power is transmitted from the piston rod to the rocker arm 43 by means of the link 46 and the roller 47.

The rocker arms are provided with passages 122, communicating with the openings 115 in the shafts 31 and 44 and these passages are adapted to deliver oil to the connections between the piston rods and the rocker arms and to the connections between the rocker arms and the connecting rods. In the cylinder to the right in Figure 3 of the drawings, oil will flow by force from the passage 115 to the roller 47 and link 46 to lubricate them, and in the cylinder to the left, oil will flow by force to the connection between the rocker arm and the connecting rod. When the position of the pistons in the cylinder is reversed, at the end of the stroke, it is apparent that oil will flow in the opposite direction.

The short connecting rod 29 in the bottom of the cylinder moves in a substantially straight line through the arc described by the end of the connecting rod 30. The movement of the rocker arms 30 and 43 is transmitted to the crank pins by the connecting rods 33 and 49, and as stated, each cylinder applies force to two crank pins during one-half the revolution and the companion cylinder applies force to the same two crank pins during the other half of the revolution.

The lubrication of the bearings through the main bearing will be apparent from the foregoing description. The oil pumped through the pipes 70 is picked up by the buckets or scoops 73 and delivered through the passages 77 to the connecting rod bearings, the outer two connecting rod bearings being lubricated through the passages 113 and 117.

The constant application of power to each section of the crank shaft produces an engine free from vibration and one that will operate without a fly wheel.

It is to be understood that the form of my invention herewith shown and described is to be taken as a preferred example of the same and that various changes in the shape, size, and arrangement of parts may be resorted to without departing from the spirit of the invention or the scope of the subjoined claims.

I claim:

1. In an internal combustion engine, a cylinder having an inlet opening adjacent one end and an exhaust opening adjacent the other end, the central portion of said cylinder forming the explosion chamber, a pair of pistons mounted in said cylinder, a piston rod connected to one of said pistons, a guide for said piston rod, a short connecting rod connected to the other piston, rocker arms pivotally mounted adjacent the ends of said cylinder and connected to said piston rod and said short connecting rod, connecting rods connected to said rocker arms, a crank shaft arranged adjacent said cylinder, and crank pins mounted on said shaft diametrically opposite each other and connected to said connecting rods.

2. In an internal combustion engine, a cylinder having an inlet opening adjacent one end and an exhaust opening adjacent the other end, the central portion of said cylinder forming the explosion chamber, a pair of pistons mounted in said cylinder, a piston rod connected to one of said pistons, a cross head secured to said piston, a stationary guide rod arranged adjacent said piston rod, a portion of said cross head being adapted to receive said guide rod, a short connecting rod connected to the other piston, rocker arms pivotally mounted adjacent the ends of said cylinder and connected to said cross head and said short connecting rod, connecting rods connected to said rocker arms, a crank shaft arranged adjacent said cylinder, and crank pins mounted on said shaft diametrically opposite each other and connected to said connecting rods.

3. In an internal combustion engine, a cylinder having an inlet opening adjacent one end and an exhaust opening adjacent the other end, the central portion of said cylinder forming the explosion chamber, a pair of pistons mounted in said cylinder, a vertically reciprocating piston rod connected to one of said pistons, a cross head secured to said piston rod, a guide rod arranged adjacent said piston, a portion of said cross head being adapted to receive said guide rod, a link pivotally secured to said cross head adjacent said piston rod, a short connecting rod connected to the other piston, rocker arms pivotally mounted adjacent the ends of said cylinder and connected to said link and said short connecting rod, connecting rods connected to said rocker arm, a crank shaft arranged adjacent said cylinder, and crank pins mounted on said shaft diametrically opposite each other and connected to said connecting rods.

4. In an internal combustion engine, a cylinder having an inlet opening adjacent one end and an exhaust opening adjacent the other end, the central portion of said cylinder forming the explosion chamber, a pair of pistons mounted in said cylinder, a piston rod connected to one of said pistons, a guide for said piston rod, a short connecting rod connected to the other piston, rocker arms pivotally mounted adjacent the ends of said cylinder and connected to said piston rod, and said short connecting rod, said rocker arms comprising two pairs of parallel arms, each pair of said arms extending in an opposite direction and being offset with relation to the other pair of said arms, connecting rods connected to said rocker arms, a crank shaft arranged adjacent said cylinder, and crank pins mounted on said shaft diametrically opposite each other and connected to said connecting rods.

In testimony whereof, I affix my signature.

ROBERT L. DENNISON.